(12) United States Patent
Ishibashi et al.

(10) Patent No.: US 8,763,365 B2
(45) Date of Patent: Jul. 1, 2014

(54) EXHAUST EMISSION CONTROL DEVICE FOR INTERNAL COMBUSTION ENGINE AND NOX PURIFICATION CATALYST DETERIORATION DETERMINATION METHOD

(75) Inventors: Yasutaka Ishibashi, Yokohama (JP); Yuuichi Hosaka, Yokohama (JP); Takeshi Ishino, Futtsu (JP); Issho Uehara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 146 days.

(21) Appl. No.: 13/387,985

(22) PCT Filed: Jul. 22, 2010

(86) PCT No.: PCT/JP2010/062742
§ 371 (c)(1),
(2), (4) Date: Jan. 30, 2012

(87) PCT Pub. No.: WO2011/024593
PCT Pub. Date: Mar. 3, 2011

(65) Prior Publication Data
US 2012/0124972 A1      May 24, 2012

(30) Foreign Application Priority Data

Aug. 26, 2009   (JP) ................................. 2009-195212

(51) Int. Cl.
*F01N 3/00*      (2006.01)
*F01N 3/10*      (2006.01)
(52) U.S. Cl.
USPC ................... 60/277; 60/276; 60/285; 60/299; 60/301

(58) Field of Classification Search
USPC ..................... 60/276, 277, 285, 286, 299, 301
See application file for complete search history.

(56) References Cited

U.S. PATENT DOCUMENTS

| 6,216,448 | B1 | 4/2001 | Schnaibel et al. | |
|---|---|---|---|---|
| 7,555,895 | B2 | 7/2009 | Shirakawa et al. | |
| 2004/0250532 | A1* | 12/2004 | Miura et al. | 60/277 |

FOREIGN PATENT DOCUMENTS

| CN | 1542264 A | 11/2004 |
|---|---|---|
| JP | 07-279728 A | 10/1995 |
| JP | 11-280455 A | 10/1999 |
| JP | 11-303621 A | 11/1999 |
| JP | 11-347369 A | 12/1999 |
| JP | 2002-332889 A | 11/2002 |
| JP | 2003-328730 A | 11/2003 |

(Continued)

OTHER PUBLICATIONS

Japanese Office Action dated Dec. 17, 2013, (2 pgs.).

(Continued)

*Primary Examiner* — Audrey K Bradley
(74) *Attorney, Agent, or Firm* — Foley & Lardner LLP

(57) ABSTRACT

An exhaust emission control device includes a first detection unit for detecting a NOx adsorption amount and an oxygen storage amount of a three-way catalyst and a NOx purification catalyst during rich spike, a second detection unit for detecting the oxygen storage amount of the three-way catalyst and the NOx purification catalyst until the output of a second air-fuel sensor becomes lean after the rich spike, and a deterioration determination unit for determining deterioration of the NOx purification catalyst based on a detected value of the first detection unit and that of the second detection unit.

6 Claims, 5 Drawing Sheets

(56) References Cited

FOREIGN PATENT DOCUMENTS

| | | |
|---|---|---|
| JP | 2005-282435 A | 10/2005 |
| JP | 2006-316752 A | 11/2006 |
| JP | 2008-144711 A | 6/2008 |
| JP | 2009-150282 A | 7/2009 |

OTHER PUBLICATIONS

Chinese Office Action dated Jan. 20, 2014, (6 pgs.).

* cited by examiner

EXHAUST EMISSION CONTROL DEVICE FOR INTERNAL COMBUSTION ENGINE AND NOX PURIFICATION CATALYST DETERIORATION DETERMINATION METHOD

FIELD OF THE INVENTION

The present invention relates to an exhaust emission control device for internal combustion engine suitable for determining deterioration of a NOx trap catalyst arranged downstream of a three-way catalyst and a NOx trap catalyst deterioration determination method.

BACKGROUND OF THE INVENTION

JP11-303621A issued in 1999 by the Japan Patent office relates to accurate detection of deterioration of a NOx trap catalyst arranged downstream of a three-way catalyst independently of a deteriorated state of the three-way catalyst. Specifically, the deteriorated state of the three-way catalyst is determined based on an output inversion time of an $O_2$ sensor downstream of the NOx trap catalyst in a stoichiometric operation. In this prior art is disclosed, as a stoichiometric control, an air-fuel ratio feedback control of skipping a proportional term as a feedback correction coefficient when the output of the $O_2$ sensor at the downstream side is switched from rich to lean and, thereafter, adding integral terms until the output is switched to rich. Here, since a switching time of the $O_2$ sensor from rich to lean or from lean to rich is proportional to oxygen storage capacity of the three-way catalyst, deterioration of the three-way catalyst is detected based on the inversion time of the output of the $O_2$ sensor.

Then, after an air-fuel ratio is maintained at a lean side and oxygen and NOx are respectively maximally adsorbed by the three-way catalyst and the NOx trap catalyst, an exhaust gas air-fuel ratio is changed to a rich side. Based on the output of the $O_2$ sensor arranged downstream of the NOx trap catalyst at this time, oxygen storage capacity and NOx adsorption capacity of the three-way catalyst and the NOx trap catalyst are detected from a time during which an air excess ratio $\lambda$ remains near a stoichiometric air-fuel ratio. If the above detection on deterioration of the three-way catalyst is considered, deterioration of the NOx trap catalyst can be specified.

SUMMARY OF THE INVENTION

Generally, in lean-burn engines and diesel engines, fuel consumption is improved by performing a lean operation as a normal operation as compared to a stoichiometric operation. However, in the above prior art, a switch from a lean air-fuel ratio to a stoichiometric air-fuel ratio is required to detect deterioration of the three-way catalyst and fuel consumption may be possibly deteriorated for diagnosis.

Accordingly, the present invention aims to provide an exhaust emission control device for internal combustion engine and a deterioration diagnosis method for NOx purification catalyst which determine a deteriorated state of a NOx trap catalyst without being affected by deterioration of a three-way catalyst arranged at an upstream side and suppress a possibility of deteriorating fuel consumption for diagnosis.

To achieve the above object, the present invention is characterized as follows. An oxygen storage amount and a NOx adsorption amount of a three-way catalyst and a NOx purification catalyst are calculated based on an output value of an upstream side air-fuel ratio sensor upstream of a three-way catalyst and that of a downstream side air-fuel ratio sensor downstream of a NOx purification catalyst when an exhaust gas air-fuel ratio is changed to rich. Further, the oxygen storage amount of the three-way catalyst and the NOx purification catalyst is calculated based on an output value of the upstream side air-fuel ratio sensor and that of the downstream side air-fuel ratio sensor when the exhaust gas air-fuel ratio is changed to lean. Deterioration of the NOx purification catalyst is determined based on the oxygen storage amount of the NOx purification catalyst when the air-fuel ratio is changed to rich and the oxygen storage amount thereof when the air-fuel ratio is changed to lean.

The detail, other features and advantages of this invention are described below and shown in the accompanying drawings.

DESCRIPTION OF THE PREFERRED EMBODIMENT

Figure 1:
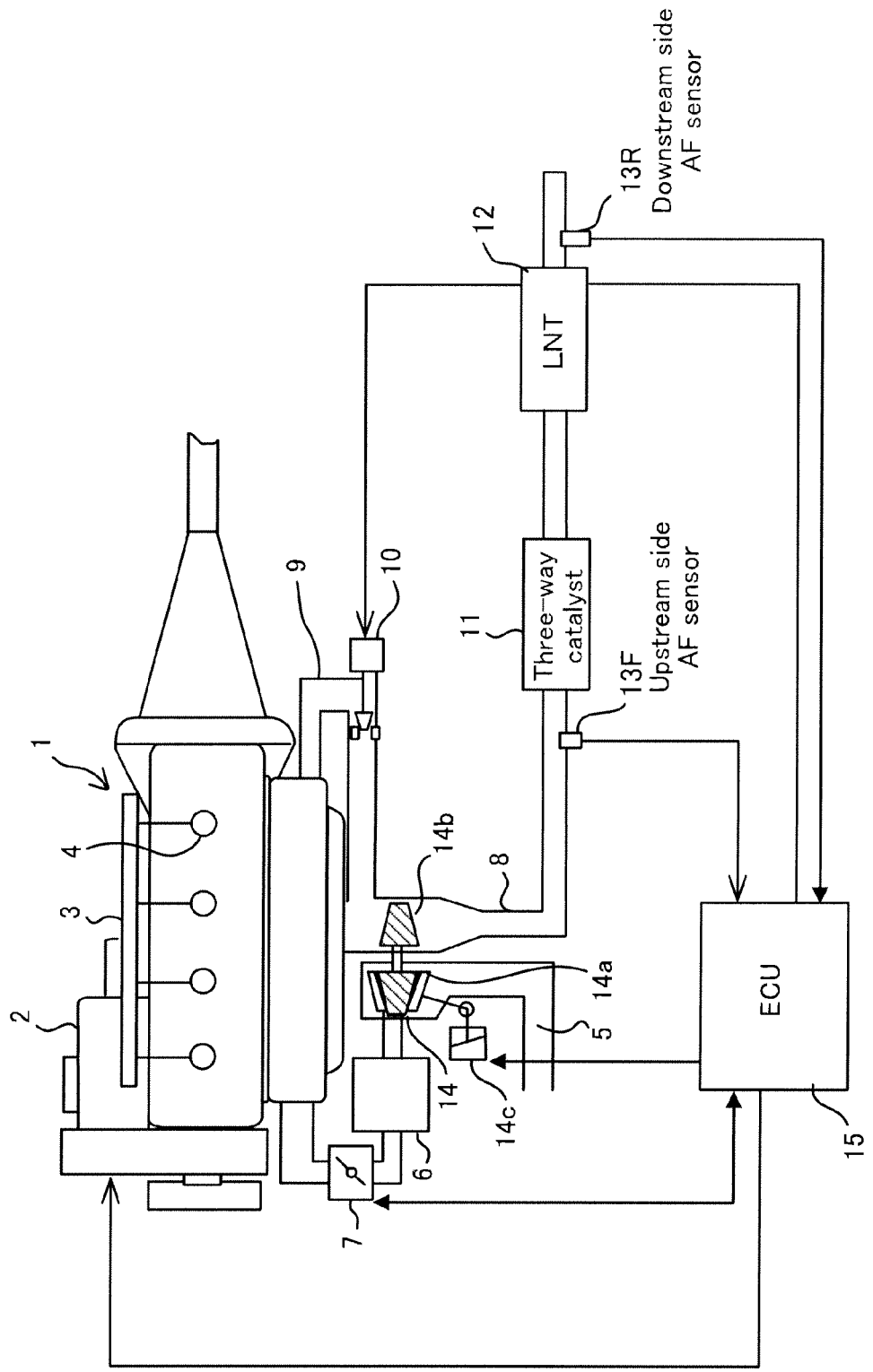
FIG. 1 is a schematic construction diagram of an exhaust emission control device for internal combustion engine according to the present invention.

With reference to FIG. 1, an internal combustion engine 1, which is a diesel internal combustion engine, includes a common rail fuel injection system composed of a fuel pump 2, a common rail 3 and a fuel injection valve 4. High-pressure fuel is supplied into the internal combustion engine 1 from this common rail fuel injection system.

An intake pipe 5 includes an intake throttle valve 7 and an intercooler 6 disposed upstream of the internal combustion engine 1 in this order in an intake air flow direction. Intake air cooled by the intercooler 6 to improve intake charging efficiency is supplied to the internal combustion engine 1 through the intake throttle valve 7. A throttle valve opening ($\theta$th) sensor is coupled to the intake throttle valve 7, outputs an electrical signal corresponding to the opening of the intake throttle valve 7 and supplies it to an electronic control unit for internal combustion engine (hereinafter, referred to as an "ECU") 15.

The ECU 15 is configured by a microcomputer including a central processing unit (CPU), a read-only memory (ROM), a random access memory (RAM) and an input/output interface (I/O interface). It is also possible to configure the ECU 15 by a plurality of microcomputers.

Exhaust gas after being burned in the internal combustion engine 1 is exhausted through an exhaust pipe 8 denoted by 8 in FIG. 1. At this time, a part of the exhaust gas may be recycled into the internal combustion engine 1 through an EGR pipe 9. The amount of the exhaust gas to be recycled can be controlled by an EGR valve 10.

A three-way catalyst 11 and a NOx trap catalyst 12 (lean NOx Trap Cat, hereinafter, merely referred to as "LNT") are disposed at a downstream side in the exhaust pipe 8 in an exhaust gas flow direction. The LNT 12 is arranged downstream of the three-way catalyst 11.

The three-way catalyst 11 contains a precious metal as an active ingredient, and includes an oxygen storage component (hereinafter, referred to as "OSC") containing a cerium oxide ($CeO_2$) as a promoter, and has oxygen storage capacity. That is, the three-way catalyst 11 has a function of absorbing and storing oxygen in exhaust gas in an exhaust gas lean state where an air-fuel ratio of an air-fuel mixture supplied to the internal combustion engine 1 is set to a side leaner than a stoichiometric air-fuel ratio and oxygen concentration in the exhaust gas is relatively high. Conversely, the three-way catalyst 11 has a function of releasing stored oxygen and oxidizing HC, CO in the exhaust gas in an exhaust gas rich state where the air-fuel ratio of the air-fuel mixture supplied to the internal combustion engine 1 is set to a side richer than the stoichiometric air-fuel ratio, oxygen concentration in the exhaust gas is low and large amount of hydrocarbon (HC) and carbon monoxide (CO) are contained.

A NOx absorbent for trapping NOx and a catalyst for promoting oxidation and reduction are built in the LNT 12. The NOx absorbent is of a storage type or an adsorption type, and either type has a property of storing or adsorbing NOx in the state where the air-fuel ratio of the air-fuel mixture supplied to the internal combustion engine 1 is set to the side leaner than the stoichiometric air-fuel ratio and oxygen concentration in the exhaust gas is relatively high, i.e. in the exhaust gas lean state rich in NOx. Conversely, either type has a property of releasing or reducing the stored NOx in the state where the air-fuel ratio of the air-fuel mixture supplied to the internal combustion engine 1 is set to the side richer than the stoichiometric air-fuel ratio, oxygen concentration in the exhaust gas is low and HC, CO components are contained much, i.e. in the exhaust gas rich state.

The LNT 12 allows the NOx absorbent to absorb NOx in the exhaust gas lean state, whereas NOx absorbed in the NOx absorbent is reduced by HC, CO and discharged as nitrogen gas in the exhaust gas rich state. Further, HC, CO are oxidized and discharged in the form of water vapor and carbon dioxide. For example, barium oxide (BaO) is used as the storage type NOx absorbent. For example, sodium (Na) and titanium (Ti) or strontium (Sr) and titanium (Ti) are used as the adsorption type NOx absorbent. For example, platinum (Pt) is used as a catalyst in both the storage type and the adsorption type.

Further, the LNT 12 includes an OSC containing cerium oxide ($CeO_2$) as its promoter and has oxygen storage capacity. This NOx absorbent generally has a property of more easily releasing the absorbed NOx as its temperature increases.

When NOx is absorbed up to a limit of NOx absorption capacity of the NOx absorbent, i.e. up to a maximum NOx absorption amount, NOx cannot be absorbed any more. Thus, the air-fuel ratio is enriched, i.e. a rich spike control is executed to appropriately release and reduce NOx.

A proportional type air-fuel ratio sensor (hereinafter, referred to as an "upstream AF sensor") 13F is mounted at a position upstream of the three-way catalyst 11, outputs an electrical signal substantially proportional to an air excess ratio $\lambda F$ indicating oxygen concentration in the exhaust gas and supplies it to the ECU 15. A proportional type air-fuel ratio sensor (hereinafter, referred to as an "downstream AF sensor") 13R is mounted at a position downstream of the LNT 12, outputs an electrical signal substantially proportional to an air excess ratio $\lambda R$ indicating oxygen concentration in the exhaust gas and supplies it to the ECU 15.

Further, the internal combustion engine 1 includes a supercharger 14. A compressor 14a of the supercharger 14 is disposed upstream of the intercooler 6 in the intake pipe 5 in the intake air flow direction and a turbine 14b thereof is disposed upstream of the LNT 12 in the exhaust pipe 8 in the exhaust gas flow direction.

When the turbine 14b is rotated by the exhaust gas from the internal combustion engine 1, the compressor 14a is rotated by the turbine 14b and the intake air can be supercharged. A supercharging pressure at this time can be controlled by a supercharging pressure control actuator 14c.

The ECU 15 is a control unit configured by the microcomputer including the CPU and its peripheral devices as described above. The fuel injection system, the intake throttle valve 7, the EGR valve 10 and the supercharging pressure control actuator 14c described above are controlled by signals from this ECU 15.

Although not shown, the ECU 15 includes an input circuit with functions of, e.g. shaping the waveforms of input signals from various sensors, correcting a voltage level to a predetermined level and converting analog signal values into digital signal values, a central processing unit (CPU), a storage for storing various computing programs executed in the CPU, computational results and the like, an output circuit for supplying a drive signal to the fuel injection valve 4, and the like.

The ECU 15 discriminates various internal combustion engine operating conditions based on various internal combustion engine parameter signals described above and calculates a fuel injection time of the fuel injection valve 4 based on the discriminated internal combustion engine operating condition.

The fuel injection time is calculated by multiplying a basic fuel injection time determined such that the air-fuel ratio of the air-fuel mixture supplied to the internal combustion engine 1 is substantially a predetermined air-fuel ratio with respect to the intake air amount of the internal combustion engine 1 by a target air-fuel ratio coefficient set based on the internal combustion engine operation parameters such as an internal combustion engine rotational speed, an absolute pressure in the intake pipe and water temperature in the internal combustion engine, an air-fuel ratio correction coefficient calculated from the excess air ratio $\lambda F$ detected by the upstream AF sensor 13F, and other correction coefficients and correction variables calculated based on various internal combustion engine parameter signals. Note that a weight flow rate is used as the intake air amount in this calculation.

The ECU 15 opens the fuel injection valve 4 based on the fuel injection time calculated as described above.

The NOx storage capacity of the NOx absorbent of the LNT 12 is reduced due to deterioration, whereby the amount of actually absorbed NOx is reduced with respect to the amount of NOx supplied to the LNT 12. In this case, the amount of supplied reducing agent is reduced as compared to normal time if rich spike is performed to reduce and purify NOx in a state where the absorbent has absorbed NOx up to an allowable amount. Thus, deterioration of the LNT 12 can be judged based on a reduction in the amount of the reducing agent.

However, if the three-way catalyst 11 is present upstream of the LNT 12, even if the reducing agent is supplied, it is used to consume oxygen stored in the three-way catalyst 11. Thus, deterioration of the LNT 12 cannot be precisely determined unless a degree of reduction in the oxygen storage capacity of the three-way catalyst 11 is known.

Accordingly, deterioration of the LNT 12 is accurately determined as follows when rich spike is performed in a state where the oxygen storage amount of the three-way catalyst 11 and the NOx absorption amount of the LNT 12 are saturated by a lean operation.

First, when the exhaust gas air-fuel ratio is changed to rich by rich spike in the state where the oxygen storage amount of the three-way catalyst 11 and the NOx absorption amount of the LNT 12 are saturated by the lean operation, oxygen of the three-way catalyst 11 is consumed and NOx absorbed by the LNT 12 is reduced until the air-fuel ratio detected by the downstream AF sensor 13R becomes rich.

Here, if the amount of the reducing agent supplied until the air-fuel ratio detected by the downstream AF sensor 13R becomes rich is reduced, there is a possibility of deterioration of at least one of the three-way catalyst 11 and the LNT 12.

On the other hand, when the air-fuel ratio of the exhaust gas supplied to the three-way catalyst 11 and the LNT 12 is changed to lean in a state where oxygen in the three-way catalyst 11 and NOx in the LNT 12 are respectively eliminated by rich spike, the air-fuel ratio detected by the downstream AF sensor 13R does not become lean until oxygen supplied to the three-way catalyst 11 exceeds a maximum storage amount and is discharged to a downstream side of the LNT 12.

Note that the amount of NOx absorbed by the LNT 12 at this time is very small and can be ignored and most of NOx can be judged to have participated in an oxidation reaction by oxygen storage of the three-way catalyst 11.

Here, if the three-way catalyst 11 is deteriorated, the amount of oxidant supplied until the air-fuel ratio detected by the downstream AF sensor 13R becomes lean is reduced. That is, deterioration of only the three-way catalyst 11 can be determined by monitoring whether or not the air-fuel ratio detected by the downstream AF sensor 13R becomes lean in response to a change of the air-fuel ratio to the lean side after the end of rich spike.

Accordingly, in the internal combustion engine 1 normally controlled at a lean air-fuel ratio, deterioration of the LNT 12 can be accurately determined only by utilizing air-fuel ratio changes at the start and end of rich spike.

Note that although the oxygen storage capacity of the LNT 12 is not described here to facilitate description, deterioration of the LNT 12 can be similarly detected even if the oxygen storage capacity of the LNT 12 is provided by the promoter.

Specific contents of the deterioration determination of the LNT 12 are described one by one below.

First, the ECU 15 calculates a stored NOx amount stored in the NOx absorbent of the LNT 12 by integrating the amount of NOx discharged per unit time in the lean operation of the internal combustion engine 1. Then, the ECU 15 discriminates whether or not the stored NOx amount stored in the NOx absorbent of the LNT 12 has exceeded an allowable value and determines that a rich spike condition is satisfied, i.e. Frich=1 if the allowable value is exceeded.

Then, the ECU 15 reduces the stored NOx by rich spike of setting a target excess air ratio λ from a lean state to a rich state beyond a stoichiometric range. This rich spike is performed for a relatively short time, e.g. for about 1 to 2 seconds and carries out "LNT deterioration determination" as to whether or not there is any performance anomaly such as deterioration of the LNT 12.

Since the rich spike control is an already known technology, it is not described in detail here. For example, as disclosed in JP7-279728A issued in 1995 by the Japan Patent Office, the rich spike control can be executed by opening the EGR valve 10 or closing the intake throttle valve 7 to reduce the intake air amount and increasing the fuel injection amount so that an engine output torque does not change. Further, as disclosed in JP2002-332889A issued in 2002 by the Japan Patent Office, it is thought to execute the rich spike control by performing auxiliary injection or post injection to additionally supply fuel in an expansion or exhaust stroke together with main injection to supply fuel in an intake or compression stroke or directly adding fuel as a reducing agent to the exhaust gas by a reducing agent adding unit.

The ECU 15 discriminates whether or not reduction of the stored NOx has been finished and resets the stored NOx amount to "zero" and ends the rich spike control when reduction of the stored NOx is finished. That is, every time the stored NOx amount in the lean operation reaches the allowable value, the rich spike control for reducing the stored NOx is executed to release NOx absorbed by the NOx absorbent.

Figure 2:
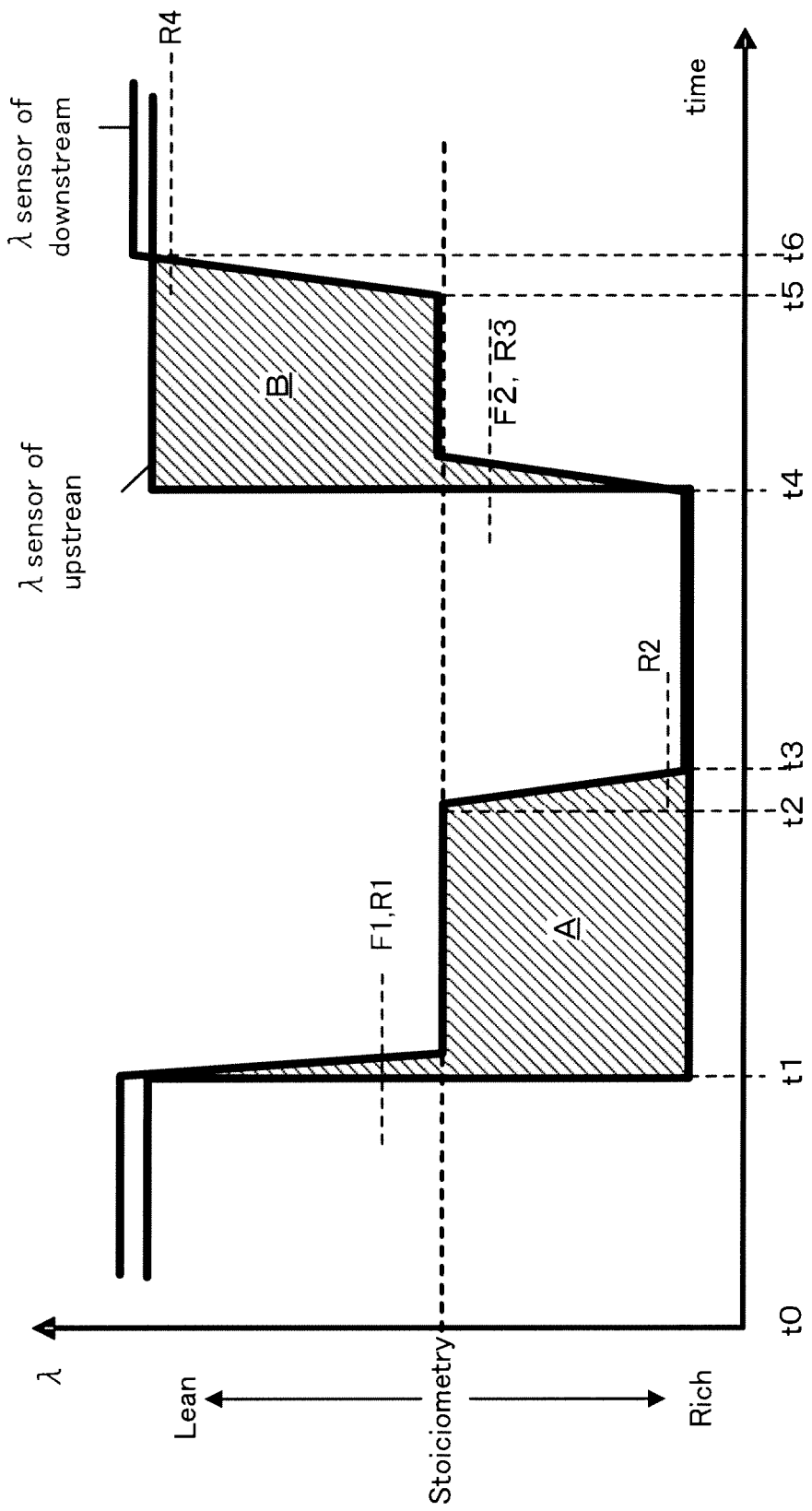
FIG. 2 is a time chart showing changing states of an output value of an upstream AF sensor and that of a downstream AF sensor during execution of a rich spike control and for a predetermined time thereafter.

FIG. 2 is a time chart showing changing states of an output value of the upstream AF sensor 13F and that of the downstream AF sensor 13R during execution of the rich spike control and at the end of the rich spike control.

According to the time chart shown in FIG. 2, the output value of the upstream AF sensor 13F, i.e. the detected excess air ratio λ quickly changes from the lean state to the rich state beyond the stoichiometric range at time t1, is maintained in the rich state from time t1 to time t4 and quickly changes from the rich state to the lean state beyond the stoichiometric range at time t4 for a period from time t1 to time t4 during which the rich spike control is executed.

On the other hand, the output value of the downstream AF sensor 13R, i.e. the detected excess air ratio λ quickly changes from the lean state to the stoichiometric range at time t1, remains in the stoichiometric range until time t2 and then changes to the rich state for the period from time t1 to time t4 during which the rich spike control is executed. This is because oxygen $O_2$ contained in the exhaust gas at the time of a steady operation in the lean state before the start of the rich spike control is stored in the three-way catalyst 11 and the LNT 12 each including the OSC containing cerium oxide ($CeO_2$) having oxygen storage capacity and the stored oxygen is released as indicated below if the exhaust gas is changed to the rich state by the rich spike control at time t1:

$$2CeO_2 \rightarrow Ce_2O_3 + 1/2 O_2.$$

In the three-way catalyst 11, HC, CO components contained in the exhaust gas are oxidized as indicated below by oxygen contained in the exhaust gas:

$$HC + O_2 \rightarrow H_2O + CO_2,$$

$$CO + O_2 \rightarrow CO_2.$$

Further, in the LNT 12, NOx absorbed by the NOx absorbent is released as indicated below:

$$NO_3- \rightarrow NO + O_2,$$

and reduced by HC, CO as indicated below:

$$NO + CO \rightarrow CO_2 + 1/2 N_2,$$

$$NO + 2HC \rightarrow 5/2 N_2 + H_2 + 3CO_2,$$

and discharged in the form of nitrogen gas and HC, CO are oxidized and discharged in the form of water vapor and carbon dioxide.

From the above, NO reduction reaction carried out in the LNT 12 and oxidation reaction by the release of oxygen from the promoters of the three-way catalyst 11 and the LNT 12 are included in an area A which is an area enclosed by the output value of the upstream AF sensor 13F and that of the downstream AF sensor 13R from time t1 to time t3.

Further, in FIG. 2, after the rich spike control, i.e. after time t1, the output value of the downstream AF sensor 13R, i.e. the detected excess air ratio λ is maintained in the rich state from t3 to time t4, quickly changes from the rich state to the stoichiometric range at time t4, and changes to the lean state after remaining in the stoichiometric range until time t5. This is because oxygen $O_2$ contained in the exhaust gas is stored in the three-way catalyst 11 and the LNT 12 each including the OSC containing cerium oxide ($CeO_2$) having oxygen storage capacity as indicated below:

$$Ce_2O_3 + 1/2 O_2 \rightarrow 2CeO_2.$$

Further, in the three-way catalyst 11, HC, CO components contained in the exhaust gas are oxidized as indicted below:

$$HC + O_2 \rightarrow H_2O + CO_2,$$

$$CO + O_2 \rightarrow CO_2.$$

Further, in the LNT 12, NOx contained in the exhaust gas is absorbed by the NOx absorbent as indicated below:

$$NO + O_2 \rightarrow NO_3^-.$$

From the above, oxidation reaction by the storage of oxygen by the promoters of the three-way catalyst 11 and the LNT 12 and NO absorption reaction carried out in the LNT 12 are included in an area B which is an area enclosed by the output value of the upstream AF sensor 13F and that of the downstream AF sensor 13R from time t4 to time t6. However, the NO absorption reaction carried out in the LNT 12 is for a very short time from time t4 to time t6 and the amount of NOx is very small and can be ignored. Thus, most of NOx can be judged to have participated in an oxidation reaction by oxygen storage by the promoters of the three-way catalyst 11 and LNT 12.

The ECU 15 carries out the LNT deterioration determination based on changes in the output values of the upstream AF sensor 13F and the downstream AF sensor 13R during execution of the rich spike control and at the end of the rich spike control.

Figure 3:
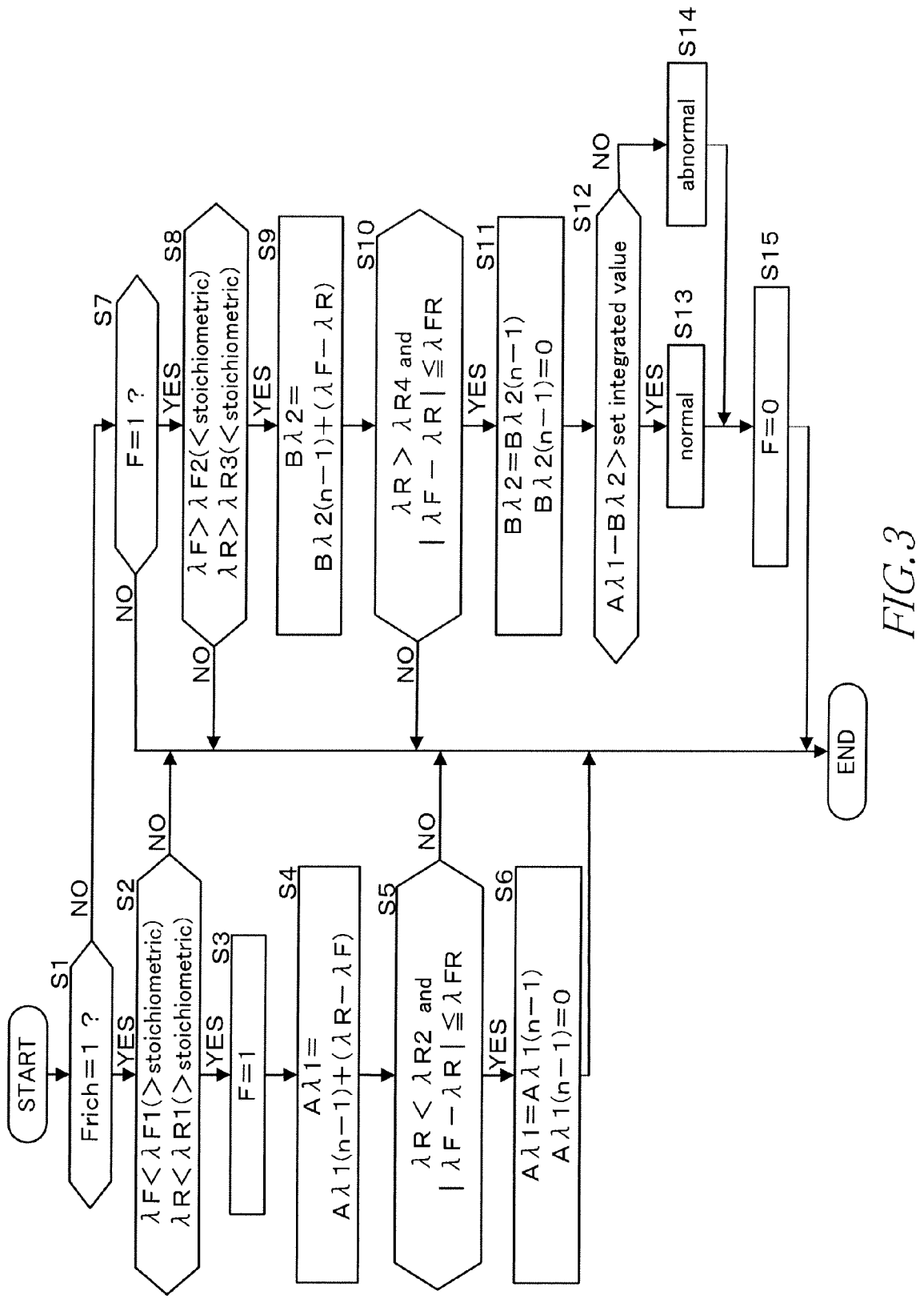
FIG. 3 is a flow chart showing a procedure of a first example of an LNT deterioration determination routine executed by an ECU during execution of the rich spike control and for the predetermined time thereafter.

FIG. 3 is a flow chart showing an "LNT deterioration determination routine" of the LNT 12 according to a first example of the present invention which is carried out, for example, every 20 milliseconds (msec) during the operation of the internal combustion engine 1 by the ECU 15 during execution of the rich spike control and for a predetermined time thereafter. The "LNT deterioration determination routine" of the LNT 12 according to the first example of the present invention is described based on the flow chart of FIG. 3. Note that, in the following description, a rich spike execution flag (hereinafter, merely referred to as flag Frich) is set at 1 "Frich=1" during execution of the rich spike control.

In this example, the upstream AF sensor 13F arranged upstream of the three-way catalyst 11 and the downstream AF sensor 13R arranged downstream of the LNT 12 are used as sensors for detecting ratios of the oxidizing agent and the reducing agent in the exhaust gas, and the amount of reduction by the LNT 12 is calculated by subtracting the area of the area B from that of the area A to carry out the LNT deterioration determination. Note that the upstream AF sensor 13F and the downstream AF sensor 13R are proportional type air-fuel ratio sensors.

In FIG. 3, the ECU 15 determines whether or not the rich spike control is allowed in Step S1, and starts the rich spike control and performs a processing of Step S2 when it is allowed. To this end, the ECU 15 determines whether or not the flag Frich=1 and performs the processing of Step S2 if Frich=1.

In Step S2, the ECU 15 determines whether or not the rich spike control has been substantially executed based on the output values of the upstream AF sensor 13F and the downstream AF sensor 13R in the time chart shown in FIG. 2. That is, the ECU 15 determines whether or not an upstream side excess air ratio λF is smaller than a set value λF1 larger than 1.0 and a downstream side excess air ratio λR is smaller than a set value λR1 larger than 1.0 and, if both rates are smaller than the set values λF1, λR1, performs a processing of Step S3. The process this time is terminated if conditions of Steps S1 and S2 do not hold.

In Step S3, the ECU 15 sets an abnormality determination execution flag F to 1 to store that abnormality determination of the LNT 12 is in execution, and performs a processing of Step S4.

In Step S4, the ECU 15 integrates the amount of reaction by the rich spike control. That is, an integrated value Aλ1 of a difference between the downstream side excess air ratio λR and the upstream side excess air ratio λF is calculated by the following equation:

$$A\lambda 1 = A\lambda 1(n-1) + (\lambda R - \lambda F)$$

where Aλ1(n−1) is an integrated value of a difference between the downstream side excess air ratio λR and the upstream side excess air ratio λF up to the last time.

In Step S5, the ECU 15 determines whether or not reaction by the rich spike control has been finished. That is, the ECU 15 determines whether or not the downstream side excess air ratio λR is smaller than a set value λR2 smaller than the set value λR1, i.e. a period during which the downstream side excess air ratio λR is maintained in a stoichiometric range as a range near the stoichiometric air-fuel ratio (hereinafter, merely referred to as "stoichiometric range") has ended and, if this period has ended, determines whether or not the difference between the upstream side excess air ratio λF and the downstream side excess air ratio λR is within a set value λFR. Then if the downstream side excess air ratio λR is not smaller than the set value λR2 or the difference between the upstream side excess air ratio and the downstream side excess air ratio is larger than the set value λFR, the process this time is terminated. Further, if the downstream side excess air ratio λR is smaller than the set value λR2 smaller than the set value λR1, the period during which the downstream side excess air ratio λR is maintained in the stoichiometric range has ended and the difference between the upstream side excess air ratioλF and the downstream side excess air ratioλR is within the set value λFR, the ECU 15 performs a processing of Step S6.

In Step S6, the ECU 15 confirms the calculated integrated value Aλ1(n−1) as a final integrated value Aλ1 for abnormality determination and clears the integrated value Aλ1(n−1). The final excess air ratio integrated value Aλ1 corresponds to the area of the area A in FIG. 2.

Steps S2 to S6 described above correspond to a first detection unit for detecting the NOx absorption amount and the oxygen storage amount of the three-way catalyst 11 and the LNT 12 based on the output value of the upstream AF sensor 13F and that of the downstream AF sensor 13R during rich spike.

Further, if it is determined that the rich spike control is not allowed in Step S1, it may be a case where the rich spike control is not allowed or a case where the rich spike control has been finished. Thus, if it is determined that the rich spike control is not allowed in Step S1, the ECU 15 determines whether or not abnormality determination of the LNT 12 is in execution in Step S7. Unless the abnormality determination execution flag F of the LNT 12 is set at 1, the process this time is terminated, assuming that the rich spike control is not allowed. However, if the abnormality determination execution flag F of the LNT 12 is set at 1, the ECU 15 performs a processing of Step S8, assuming that the rich spike control has been finished.

In Step S8, the ECU 15 determines whether or not the rich spike control has been substantially finished based on the output values of the upstream AF sensor 13F and the downstream AF sensor 13R in the time chart shown in FIG. 2. That is, the ECU 15 determines whether or not the upstream side excess air ratio $\lambda F$ is larger than a set value $\lambda F2$ smaller than 1.0 and the downstream side excess air ratio $\lambda R$ is larger than a set value $\lambda R3$ smaller than 1.0 and, if both rates are larger than the set values $\lambda F2$, $\lambda R3$, performs a processing of Step S9. The process this time is terminated if conditions of Steps S7 and S8 do not hold.

In Step S9, the ECU 15 calculates the amount of reaction by the end of the rich spike control. That is, an integrated value $B\lambda 2$ of a difference between the downstream side excess air ratio $\lambda R$ and the upstream side excess air ratio $\lambda F$ is calculated by the following equation:

$$B\lambda 2 = B\lambda 2(n-1) + (\lambda F - \lambda R)$$

where $B\lambda 2(n-1)$ is an integrated value of the difference between the downstream side excess air ratio $\lambda R$ and the upstream side excess air ratio $\lambda F$ up to the last time.

In Step S10, the ECU 15 determines whether or not reaction by the end of the rich spike control has been finished. That is, the ECU 15 determines whether or not the downstream side excess air ratio $\lambda R$ is smaller than a predetermined value $\lambda R4$ larger than the set value $\lambda R3$, i.e. a period during which the downstream side excess air ratio $\lambda R$ is maintained in the stoichiometric range has ended and, if this period has ended, determines whether or not the difference between the upstream side excess air ratio $\lambda F$ and the downstream side excess air ratio $\lambda R$ is within the set value $\lambda FR$. If the downstream side excess air ratio $\lambda R$ is not larger than the set value $\lambda R4$ or the difference between the upstream side excess air ratio and the downstream side excess air ratio is larger than the set value $\lambda FR$, the process this time is terminated. Further, if the downstream side excess air ratio $\lambda R$ is larger than the set value $\lambda R4$ larger than the set value $\lambda R3$, the period during which the downstream side excess air ratio $\lambda R$ is maintained in the stoichiometric range has ended and the difference between the upstream side excess air ratio $\lambda F$ and the downstream side excess air ratio $\lambda R$ is within the set value $\lambda FR$, the ECU 15 performs a processing of Step S11.

In Step S11, the ECU 15 confirms the calculated integrated value $B\lambda 2(n-1)$ as a final integrated value $B\lambda 2$ for abnormality determination and clears the integrated value $B\lambda 2(n-1)$. The final integrated value $B\lambda 2$ corresponds to the area of the area B in FIG. 2.

Steps S7 to S11 described above correspond to a second detection unit for detecting the oxygen storage amount of the three-way catalyst 11 and the LNT 12 based on the output value of the upstream AF sensor 13F and that of the downstream AF sensor 13R until the exhaust gas air-fuel ratio is changed to lean after rich spike and the output of the downstream AF sensor 13R becomes lean.

In Step S12, the ECU 15 calculates a difference by subtracting the final integrated value $B\lambda 2$ for abnormality determination confirmed in Step S11 from the final integrated value $A\lambda 1$ for abnormality determination confirmed in Step S6. This difference corresponds to an area obtained by subtracting the area of the area B from that of the area A in FIG. 2. The NO reduction reaction carried out in the LNT 12 and the oxidation reaction by the release of oxygen from the promoters of the three-way catalyst 11 and the LNT 12 are included in the area of the area A, whereas the oxidation reaction by the storage of oxygen by the promoters of the three-way catalyst 11 and the LNT 12 is mostly included in the area of the area B. Thus, this difference corresponds to the NO reduction reaction carried out in the LNT 12.

The ECU 15 determines whether or not this difference is more than a set integrated value set in advance, and determines that the catalyst is in a normal state in Step S13 and terminates the process by setting the abnormality determination execution flag F to 0 in Step S15 if the difference is more than the set integrated value set in advance. Further, unless the difference is more than the set integrated value set in advance, the ECU 15 determines that the catalyst is in an abnormal state (deteriorated) in Step S14 and terminates the process by setting the abnormality determination execution flag to 0 in Step S15.

In this example, the $O_2$ storage amount in the promoters is detected by calculating the area of the area B. Since this $O_2$ storage amount corresponds to the oxidation reaction in the area A, it is possible to detect only the NOx reduction amount in the area A by subtracting the $O_2$ storage amount in the area B from the total area of the area A. Thus, it is possible to determine deterioration of only the LNT 12.

Steps S12 to S14 described above correspond to a deterioration determination unit.

Figure 4:
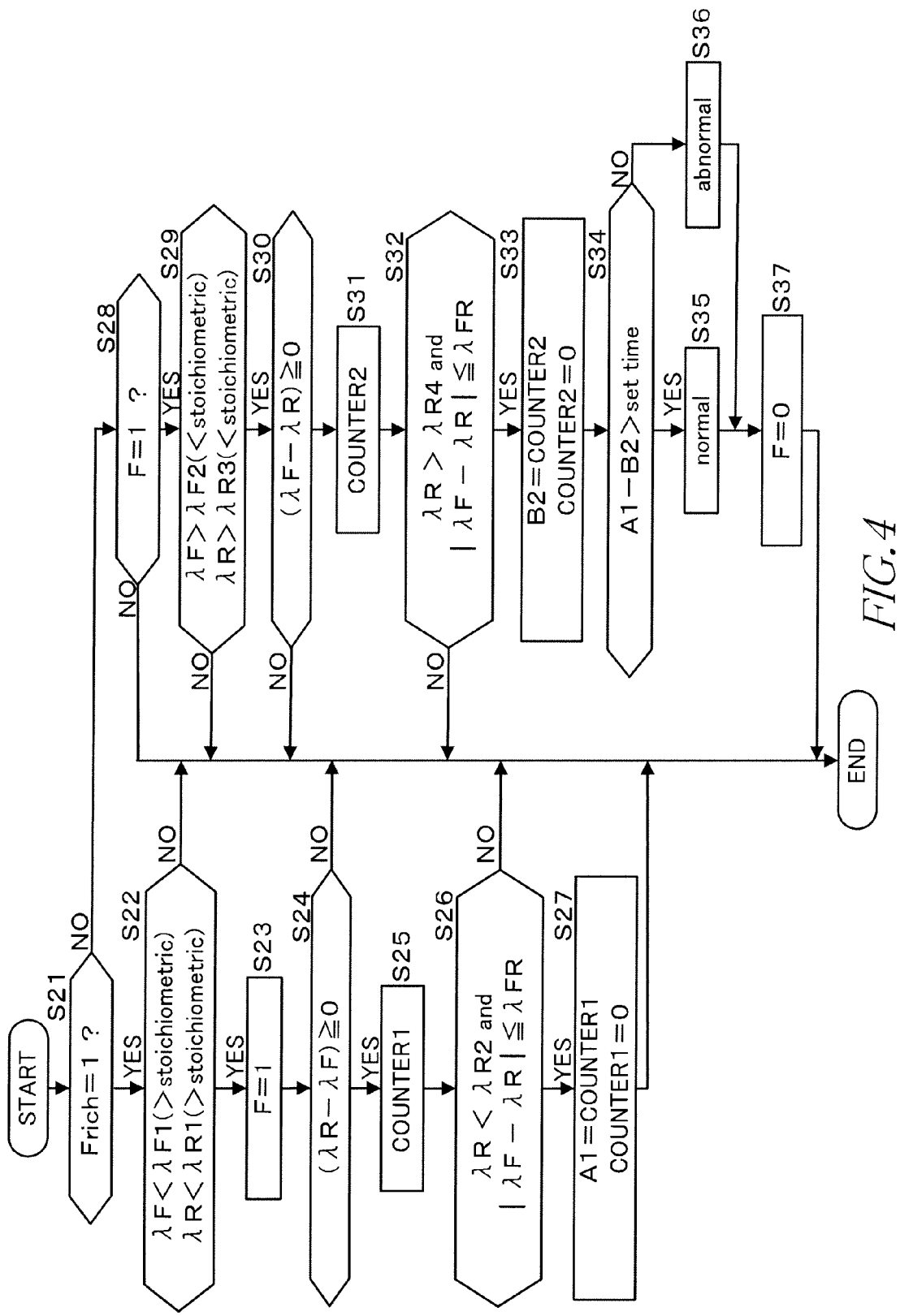
FIG. 4 is a flow chart showing a procedure of a second example of the LNT deterioration determination routine executed by the ECU during execution of the rich spike control and for the predetermined time thereafter.

FIG. 4 is a flow chart showing an "LNT deterioration determination routine" of the LNT 12 according to a second example of the present invention which is carried out every 20 msec during the operation of the internal combustion engine 1 by the ECU 15 during execution of the rich spike control and for a predetermined period thereafter. The "LNT deterioration determination routine" of the LNT 12 according to the second example of the present invention is described based on the flow chart of FIG. 4.

In this example, the upstream AF sensor 13F arranged upstream of the three-way catalyst 11 and the downstream AF sensor 13R arranged downstream of the LNT 12 are used as sensors for detecting ratios of the oxidizing agent and the reducing agent in the exhaust gas, and the amount of reduction by the LNT 12 is calculated by subtracting the appearance time of the area B from that of the area A to carry out the LNT deterioration determination.

In Step S21, the ECU 15 determines whether or not the rich spike control is allowed as in Step S1 of the first example, and starts the rich spike control and performs a processing of Step S22 when it is allowed. To this end, the ECU 15 determines whether or not the flag Frich is set and performs the processing of Step S22 if Frich=1.

In Step S22, the ECU 15 determines whether or not the rich spike control has been substantially executed based on the output values of the upstream AF sensor 13F and the downstream AF sensor 13R in the time chart shown in FIG. 2. That is, the ECU 15 determines whether or not the upstream side excess air ratio $\lambda F$ is smaller than the set value $\lambda F1$ larger than 1.0 and the downstream side excess air ratio $\lambda R$ is smaller than the set value $\lambda R1$ larger than 1.0 and, if both rates are smaller than the set values $\lambda F1$, $\lambda R1$, performs a processing of Step S23. The process this time is terminated if conditions of Steps S21 and S22 do not hold.

In Step S23, the ECU 15 sets the abnormality determination execution flag F of the LNT 12 to 1 as in Step S3 of the first example to store that abnormality determination of the LNT 12 is in execution, and performs a processing of Step S24.

In Step S24, the ECU 15 calculates whether or not the downstream side excess air ratio λR is larger than the upstream side excess air ratio λF and, if it is larger, proceeds to Step S25 to increment a calculation time COUNTER1 and performs a processing of Step S26. However, if the downstream side excess air ratio λR is smaller than the upstream side excess air ratio λF, the process this time is terminated.

In Step S26, the ECU 15 determines whether or not reaction by the rich spike control has been finished as in Step S5 of the first example. That is, the ECU 15 determines whether or not the downstream side excess air ratio λR is smaller than the set value λR2 smaller than the set value λR1, i.e. the period during which the downstream side excess air ratio λR is maintained in the stoichiometric range has ended and, if this period has ended, determines whether or not the difference between the upstream side excess air ratio λF and the downstream side excess air ratio λR is within the set value λR. If the downstream side excess air ratio λR is not smaller than the set value λR2 or the difference between the upstream side excess air ratio and the downstream side excess air ratio is larger than the set value λFR, the process this time is terminated. Further, if the downstream side excess air ratio λR is smaller than the set value λR2 smaller than the set value λR1, the period during which the downstream side excess air ratio λR is maintained in the stoichiometric range has ended and the difference between the upstream side excess air ratio and the downstream side excess air ratio is within the set value λFR, the ECU 15 performs a processing of Step S27.

In Step S27, the ECU 15 confirms the calculation time COUNTER1 as a final cumulative time A1 for abnormality determination and clears the calculation time COUNTER1. The final cumulative time A1 corresponds to a period between time t1 and t3 including the area A in FIG. 2.

If it is determined that the rich spike control is not allowed in Step S21, it may be a case where the rich spike control is not allowed or a case where the rich spike control has been finished. Thus, if it is determined that the rich spike control is not allowed in Step S21, the ECU 15 performs a processing of Step S28 to determine whether or not abnormality determination of the LNT 12 is in execution. Unless the abnormality determination execution flag F of the LNT 12 is set at 1, the process this time is terminated, assuming that the rich spike control is not allowed. However, if the abnormality determination execution flag F of the LNT 12 is set at 1, the ECU 15 performs a processing of Step S29, assuming that the rich spike control has been finished.

In Step S29, the ECU 15 determines whether or not the rich spike control has been substantially finished based on the output values of the upstream AF sensor 13F and the downstream AF sensor 13R in the time chart shown in FIG. 2. That is, the ECU 15 determines whether or not the upstream side excess air ratio λF is larger than the set value λF2 smaller than 1.0 and the downstream side excess air ratio λR is larger than the set value λR3 smaller than 1.0 and, if both rates are larger than the set values λF2, λR3, performs a processing of Step S30.

In Step S30, the ECU 15 calculates whether or not the upstream side excess air ratio λF is larger than the downstream side excess air ratio λR and, if it is larger, increments a calculation time COUNTER2 in Step S31 and performs a processing of Step S32. However, if conditions of Steps S28 to S30 do not hold, the process this time is terminated.

In Step S32, the ECU 15 determines whether or not reaction by the end of the rich spike control has been finished.

That is, the ECU 15 determines whether or not the downstream side excess air ratio λR is larger than the set value λR4 larger than the set value λR3, i.e. the period during which the downstream side excess air ratio λR is maintained in the stoichiometric range has ended and, if this period has ended, determines whether or not the difference between the upstream side excess air ratio λF and the downstream side excess air ratio λR is within the set value λFR. If the downstream side excess air ratio λR is not larger than the set value λR4 or the difference between the upstream side excess air ratio and the downstream side excess air ratio is larger than the set value ΔλFR, the process this time is terminated. Further, if the downstream side excess air ratio λR is larger than the set value λR4 larger than the set value λR3, the period during which the downstream side excess air ratio λR is maintained in the stoichiometric range has ended and the difference between the upstream side excess air ratio λF and the downstream side excess air ratio λR is within the set value λFR, the ECU 15 performs a processing of Step S33.

In Step S33, the ECU 15 confirms the calculation time COUNTER2 as a final cumulative time B2 for abnormality determination and clears the calculation time COUNTER2. The final cumulative time B2 corresponds to a period between time t4 and time t6 including the area B in FIG. 2.

In Step S34, the ECU 15 calculates a difference time by subtracting the final cumulative time B2 for abnormality determination confirmed in Step S33 from the final cumulative time A1 for abnormality determination confirmed in Step S27. The difference time corresponds to a time obtained by subtracting the appearance time of the area B from that of the area A in FIG. 2. The NO reduction reaction carried out in the LNT 12 and the oxidation reaction by the release of oxygen from the promoters of the three-way catalyst 11 and the LNT 12 are included during the appearance time of the area A, whereas the oxidation reaction by the storage of oxygen by the promoters of the three-way catalyst 11 and the LNT 12 is mostly included during the appearance time of the area B. Thus, the above difference time corresponds to the NO reduction reaction carried out in the LNT 12.

The ECU 15 determines whether or not the difference time is more than a set time set in advance, and determines that the catalyst is in a normal state in Step S35 and terminates the process by setting the abnormality determination execution flag F to 0 in Step S37 if the difference time is more than the set time set in advance. Further, unless the difference time is more than the set time set in advance, the ECU 15 determines that the catalyst is deteriorated in Step S36 and terminates the process by setting the abnormality determination execution flag F to 0 in Step S37.

Note that the appearance time of the area A and that of the area B change depending on an exhaust gas flow rate per unit time. The respective times become shorter when the exhaust gas flow rate is high and, conversely, become longer when the exhaust gas flow rate is low.

Thus, the appearance time of the area A and that of the area B may be corrected according to the exhaust gas flow rate, e.g. the amount of air measured by an air flow meter and the set times set in advance may be respectively set according to the exhaust gas flow rate, e.g. the amount of air measured by the air flow meter.

In this example, the $O_2$ storage amount in the promoters is detected by the appearance time of the area B. Since this $O_2$ storage amount corresponds to the oxidation reaction in the area A, it is possible to detect only the NOx reduction amount in the area A by subtracting the appearance time of the area B from the total appearance time of the area A. Thus, it is possible to determine deterioration of only the LNT 12.

Note that although the LNT deterioration determination is invariably carried out at a timing related to the rich spike control in the above embodiments, it may be carried out only in a steady operating condition of the internal combustion engine 1.

Figure 5:
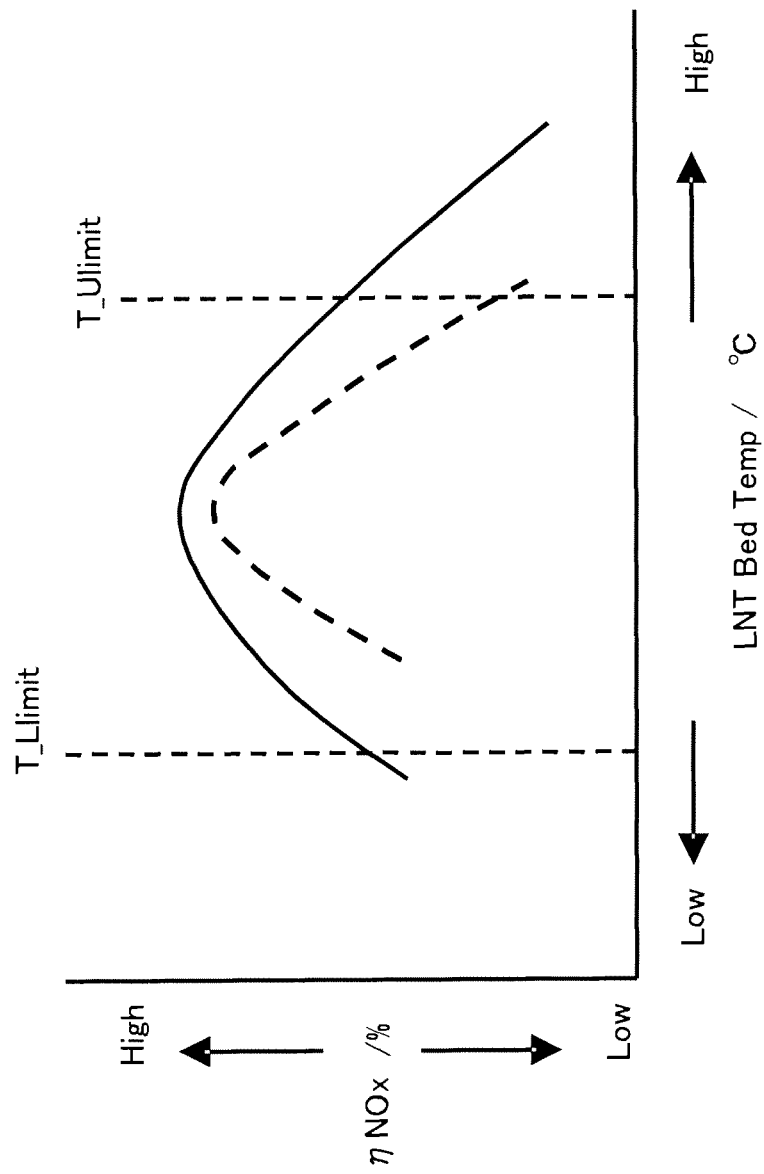
FIG. 5 is a characteristic diagram showing conversion efficiency $\eta$NOx in relation to bed temperature of a NOx trap catalyst.

Further, as shown by solid line in FIG. 5, the LNT 12 has such a tendency that conversion efficiency ηNOx increases as bed temperature thereof increases from lower limit temperature T_Llimit, shows maximum ηNOx conversion efficiency at specific temperature, decreases as temperature increases at a side higher than the specific temperature, and extremely decreases when the temperature exceeds upper limit temperature T_Ulimit. As the NOx purification catalyst is more deteriorated, conversion efficiency characteristics at low-temperature and high-temperature sides are further reduced as shown by broken line. Thus, if the LNT deterioration determination is carried out when the bed temperature of the LNT 12 is in a temperature range shifted toward the upper limit temperature TT_Ulimit side or the lower limit temperature T_Llimit side from the specific temperature showing the maximum NOx conversion efficiency, a deteriorated state of the LNT 12 becomes clear and can be reliably determined.

Further, although the AF sensors have been used as the sensors for detecting the excess air ratios at the sides upstream of the three-way catalyst 11 and downstream of the LNT 12 in the above embodiments, either one of them or both of them may be replaced by $O_2$ sensor(s).

It is apparent that the present invention is not limited to the above embodiments and various changes can be made within the scope of the technical idea of the present invention.

Regarding the above description, the contents of Japanese Patent Application No. 2009-195212 filed in Japan on Aug. 26, 2009 are hereby incorporated by reference.

Exclusive properties or features encompassed by the embodiments of this invention are claimed as below.

The invention claimed is:

1. An exhaust emission control device for an internal combustion engine, comprising:
   a NOx purification catalyst provided in an exhaust system of the internal combustion engine;
   a three-way catalyst provided upstream of the NOx purification catalyst and having oxygen storage capacity;
   an upstream side air-fuel ratio sensor provided upstream of the three-way catalyst and configured to detect an exhaust gas air-fuel ratio;
   a downstream side air-fuel ratio sensor provided downstream of the NOx purification catalyst and configured to detect the exhaust gas air-fuel ratio;
   a rich spike unit configured to change the air-fuel ratio of exhaust gas discharged from the internal combustion engine from lean to rich and to return the air-fuel ratio to lean after the elapse of a predetermined time to reduce and purify the NOx absorbed by the NOx purification catalyst;
   a first detection unit configured to detect a NOx absorption amount and an oxygen storage amount of the three-way catalyst and the NOx purification catalyst based on an output value of the upstream side air-fuel ratio sensor and that of the downstream side air-fuel ratio sensor during rich spike by the rich spike unit;
   a second detection unit configured to detect the oxygen storage amount of the three-way catalyst and the NOx purification catalyst based on the output value of the upstream side air-fuel ratio sensor and that of the downstream side air-fuel ratio sensor until the exhaust gas air-fuel ratio changes to lean after the rich spike and the output of the downstream side air-fuel ratio sensor becomes lean; and
   a deterioration determination unit configured to determine deterioration of the NOx purification catalyst based on a detected value of the first detection unit and that of the second detection unit.

2. The exhaust emission control device for an internal combustion engine according to claim 1, wherein the deterioration determination unit is configured to determine that the NOx purification catalyst is deteriorated when a value obtained by subtracting the oxygen storage amount detected by the second detection unit from the NOx adsorption amount and the oxygen storage amount detected by the first detection unit is smaller than a deterioration determination threshold value for the NOx purification catalyst.

3. The exhaust emission control device for an internal combustion engine according to claim 1, wherein the deterioration determination unit is configured to carry out deterioration determination for the NOx purification catalyst when a bed temperature of the NOx purification catalyst is in a temperature range shifted toward a lower limit temperature side or an upper limit temperature side from a temperature showing maximum NOx conversion efficiency.

4. An exhaust emission control device for an internal combustion engine, comprising:
   a NOx purification catalyst provided in an exhaust system of the internal combustion engine;
   a three-way catalyst provided upstream of the NOx purification catalyst and having oxygen storage capacity;
   an upstream side air-fuel ratio sensor provided upstream of the three-way catalyst and configured to detect an exhaust gas air-fuel ratio;
   a downstream side air-fuel ratio sensor provided downstream of the NOx purification catalyst and configured to detect the exhaust gas air-fuel ratio;
   a rich spike unit, comprising a computer, configured to change the air-fuel ratio of exhaust gas discharged from the internal combustion engine from lean to rich and to return the air-fuel ratio to lean after the elapse of a predetermined time to reduce and purify the NOx absorbed by the NOx purification catalyst;
   a first detection unit, comprising a computer, configured to detect a NOx absorption amount and an oxygen storage amount of the three-way catalyst and the NOx purification catalyst based on an output value of the upstream side air-fuel ratio sensor and that of the downstream side air-fuel ratio sensor during rich spike by the rich spike unit;
   a second detection unit, comprising a computer, configured to detect the oxygen storage amount of the three-way catalyst and the NOx purification catalyst based on the output value of the upstream side air-fuel ratio sensor and that of the downstream side air-fuel ratio sensor until the exhaust gas air-fuel ratio changes to lean after the rich spike and the output of the downstream side air-fuel ratio sensor becomes lean; and
   a deterioration determination unit, comprising a computer, configured to determine deterioration of the NOx purification catalyst based on a detected value of the first detection unit and that of the second detection unit.

5. A NOx purification catalyst deterioration determination method for determining deterioration of a NOx purification catalyst provided downstream of a three-way catalyst having oxygen storage capacity in an exhaust system of an internal combustion engine, comprising:

a rich spike step of changing an air-fuel ratio of the internal combustion engine from lean to rich and returning the air-fuel ratio to lean after the elapse of a predetermined time to reduce and purify the NOx absorbed by the NOx purification catalyst;

a first calculation step of calculating a time until an air-fuel ratio detected value at a side downstream of the NOx purification catalyst coincides with that at a side upstream of the three-way catalyst or an integrated value of a difference between the air-fuel ratio detected value at the side downstream of the NOx purification catalyst and that at the side upstream of the three-way catalyst during this time when the exhaust gas air-fuel ratio of the internal combustion engine changes to rich;

a second calculation step of calculating a time until an air-fuel ratio detected value at the side downstream of the NOx purification catalyst coincides with that at the side upstream of the three-way catalyst or an integrated value of a difference between the air-fuel ratio detected value at the side downstream of the NOx purification catalyst and that at the side upstream of the three-way catalyst during this time when the exhaust gas air-fuel ratio of the internal combustion engine changes to lean; and a deterioration determination step of determining deterioration of the NOx purification catalyst based on a calculated value in the first calculation step and that in the second calculation step.

6. The NOx purification catalyst deterioration determination method according to claim 5, wherein the NOx purification catalyst is determined to be deteriorated in the deterioration determination step when a difference between the calculated value in the first calculation step and that in the second calculation step falls to or below a predetermined value set in advance.

* * * * *